No. 763,829. PATENTED JUNE 28, 1904.
P. H. WYNNE.
APPARATUS FOR READING ANGULAR DEFLECTIONS.
APPLICATION FILED JAN. 16, 1903.
NO MODEL.

WITNESSES:
Richard C. Whitford
Ina M. Baker.

Philip Henry Wynne INVENTOR.

BY
Eleazar Cate
ATTORNEY.

No. 763,829. Patented June 28, 1904.

UNITED STATES PATENT OFFICE.

PHILIP HENRY WYNNE, OF BOSTON, MASSACHUSETTS, ASSIGNOR TO L. E. KNOTT APPARATUS COMPANY, OF BOSTON, MASSACHUSETTS, A CORPORATION OF MASSACHUSETTS, AND AGNES WYNNE, OF BOSTON, MASSACHUSETTS.

APPARATUS FOR READING ANGULAR DEFLECTIONS.

SPECIFICATION forming part of Letters Patent No. 763,829, dated June 28, 1904.

Application filed January 16, 1903. Serial No. 139,355. (No model.)

*To all whom it may concern:*

Be it known that I, PHILIP HENRY WYNNE, a citizen of the United States, residing at Boston, county of Suffolk, State of Massachusetts, have invented certain new and useful Improvements in Apparatus for Reading Angular Deflections, of which the following, taken in connection with the accompanying drawings, is a specification.

My invention relates particularly to an improved apparatus for making discernible the nature or amount of motion which indicates qualitatively or quantitatively the magnitude of a phenomenon under observation—such, for instance, as the strength or direction of an electric current or of a magnetic field, the elasticity and strength in various materials, moments of inertia, the expansion or contraction of materials under different conditions, &c.

My device is especially adapted for reading the deflections of galvanometers, ammeters, voltmeters, magnetometers, electrometers, &c., although its field of operation is by no means limited to its use in connection with these instruments, as it can be used directly or indirectly in making almost any variety of measurement.

The object of my invention is to provide a simple and inexpensive device by means of which delicate and accurate measurement of small motions or deflections may be made, and which will be convenient to use and free from certain errors to which most devices for the purpose are inherently liable.

My apparatus is simpler in construction as well as in use and therefore less troublesome and liable to derangement than other devices of comparable accuracy and sensitiveness.

In illustrating my invention in the accompanying drawings I have chosen to show it in connection with a galvanometer of some familiar type.

Figure 1:
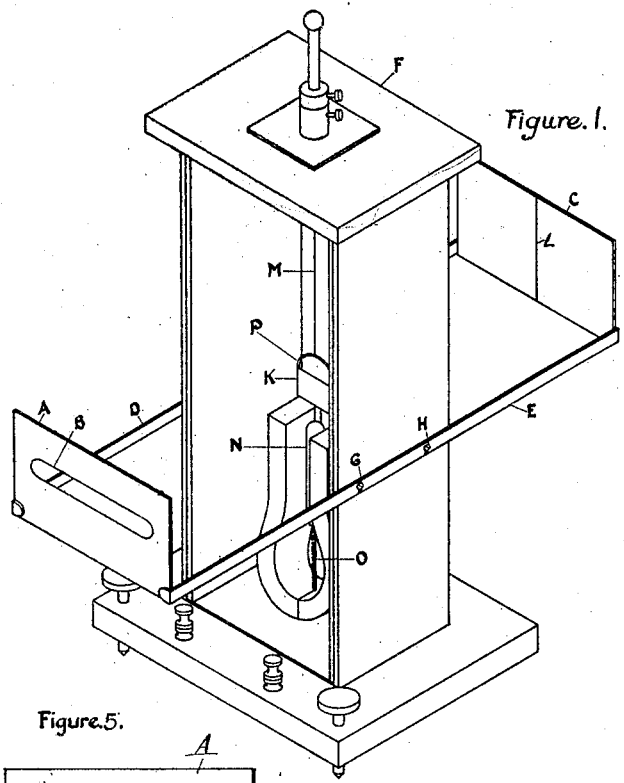
Figure 2:
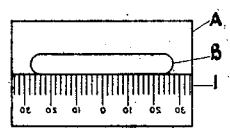
Figure 3:
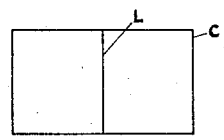
Figure 5:
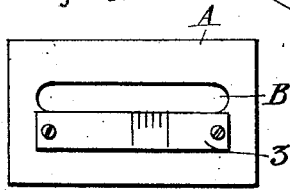
Figure 4:
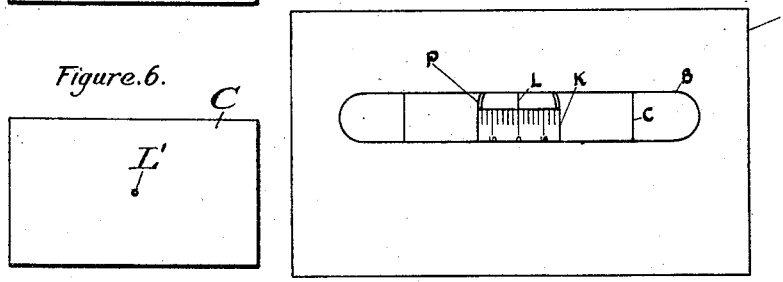
Figure 6:
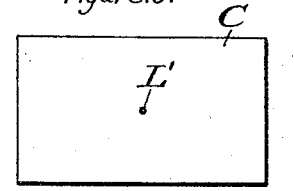

In the drawings, Figure 1 is a perspective view of a galvanometer equipped with my invention. Fig. 2 shows that face of the front plate which is turned toward the galvanometer. Fig. 3 shows that face of the rear plate which is turned toward the instrument; and Fig. 4 shows the front plate, the galvanometer-mirror exhibiting the reflection of part of the scale therein and the rear plate with its reference or fiducial mark as they appear in actual use of the apparatus. Figs. 5 and 6 show modifications.

Similar letters refer to similar parts throughout the several drawings.

The elements which enter into my apparatus are the mirror, which is associated with the instrument with which the invention is used and which is adapted to be deflected by the quantity under observation, the existence, amount, or direction of the deflection being the phenomena it is desired to note, a scale so disposed that its reflection in the mirror is visible to the eye of the observer, and a reference or fiducial mark which is placed on the opposite side of the mirror from the scale and in such a position that the plane which includes the observer's eye and said mark intersects the reflection of the scale in the mirror. These elements may assume various forms and may be supported in various ways, according to the requirements of the instrument in connection with which they are used. In the illustration of the invention in the drawings the galvanometer F is of the kind known as the "D'Arsonval," concerning whose mode of action little need be said beyond the statement that the amount of current passing through the instrument is measured by the amount of angular motion of the suspended coil N, and consequently of the mirror K, which is rigidly attached to the coil. The fine metallic fiber M by means of which the coil is suspended has a considerable amount of torsional flexibility, which allows the coil and mirror to rotate about a vertical axis which passes approximately through the plane of the reflecting-face of the mirror. In the form of galvanometer herein illustrated the current enters the suspended coil through the fiber M and leaves it through a similar fiber O, which is curled into the form of a spiral in order to present a minimum resistance to the rotation of the coil and mirror. In this form of my invention the scale is illustrated as being placed on one face of a plate A, which is hereinafter referred to as the "front" plate. Graduations of the scale may be formed on or applied directly to the surface of said front plate or may be formed on a separate member 3, (see Fig. 5,) which is secured to the front plate, or arranged in any suitable way, provided said scale is so displayed as to form a suitable image in the mirror. When set up for use, the front plate is so situated that the reflection of the scale in the mirror can be seen by the observer from his position of observation. The reference or fiducial mark L is placed on the opposite side of the mirror from the scale, and may either be a fine wire or hair properly supported or a line or mark properly formed on any suitable backing or support, or any other suitable mark which can be actually seen by the observer. One of the important features of my apparatus is that the fiducial mark which the observer sees is the actual mark itself and not a reflected image thereof. In this form of my invention said mark is formed on a plate C, which I have termed the "rear" plate, either by scratching a line on the face of the plate or applying a line thereto, as with a pen or pencil. For convenience in supporting and properly positioning the front and rear plates I have illustrated side bars D and E. When the invention is applied to this form of galvanometer, said bars can conveniently be secured to the sides of the instrument by means of screws G and H, which pass through vertical slots in the bars. This construction makes the device readily removable without the necessity of withdrawing the screws. The front and rear plates, however, could be supported in any other way without at all departing from my invention.

In using my instrument in noting deflections it is essential that the observer should have an unobstructed view of both the mirror and the reference-mark, and therefore unless the front and rear faces of the instrument are of glass, as is the case with the galvanometer herein illustrated, it would be necessary to form suitable openings in such faces to give the necessary view of these parts or to so arrange the parts with relation to each other as to enable the observer to obtain the necessary view of both the reflection in the mirror and the fiducial mark. Such unobstructed view of both the reflection of the scale in the mirror and the reference-mark can be better obtained by securing the suspension-cord M to the top of an arch or loop of wire P, which in turn is made fast to and supports the mirror and coil, for it will be seen that with the usual arrangement where the fiber M is attached directly to the edge of the mirror such fiber would come between the eye and the reference-mark, thus obscuring the view of the latter at the important point where it intersects with the edge of the mirror and touches the reflection of the scale. Other suitable ways of attaching the fiber to the mirror so as to secure this unobstructed view may be employed, however, without departing from the invention. I find that the instrument is more easily read if some means are provided which act as a guide for the observer in helping him to properly place his eye. Various devices may be employed to thus aid the observer in properly locating his eye, and that illustrated is a sight-opening B in the plate A.

It is preferable that the scale-figures should be "perverted," as shown in Fig. 2—that is, that the left and right hand sides of the natural characters be interchanged, as in printers' types. By this means they appear in correct form when reflected in the mirror K.

In order to simplify the use of my apparatus in reading deflections, I prefer, whenever possible, to place the reference-mark L and the scale I at substantially equal distances from the reflecting-face of the mirror, or, in other words, to place the mirror approximately midway between the scale and reference-mark. This particular arrangement, however, is not absolutely essential.

In using my improved apparatus it is first necessary properly to adjust and position the scale and reference-mark with relation to the mirror, so that both the reflection of the scale in the mirror and the reference-mark itself (not its reflected image) are visible to the observer from the sight-opening. The reading of the deflections of the mirror can be facilitated by further adjusting the parts so that the axis of motion of the mirror coincides with the center line thereof and is in the same plane as the reference-mark and the center or zero line of the graduation and also so that the upper edge of the mirror is on a level with or a trifle higher than the bottom of the sight-hole. If the scale is just as far in front of the mirror as the reference-mark is behind, the reflection of the scale when the apparatus is in the "zero position" just described will apparently be seen in the same plane as the reference-mark itself, and the reflection of the zero-line of the scale will appear to the eye as a downward continuation of the non-reflected reference-mark. Moreover, by the laws of reflection the reference-mark and the image of the zero-line will not separate even if the eye be moved away from the center of the sight-hole, but will remain in coincidence so long as both are visible in the mirror. Therefore the observer's eye need not be placed centrally with regard to the sight-opening in order to secure correct readings, for if the eye is moved toward either end of the sight-opening the image of the zero-graduation, together with the reference-mark, will have a simultaneous and equal apparent motion with respect to the edges of the mirror, and the reading "zero" will not, therefore, be disturbed. This fact not only saves much trouble in placing the eye, thereby making readings simpler and easier, but it does away with the error known as "parallax," to which the readings of many instruments of precision are liable. Now all adjustments having been made and the apparatus being in the zero position, let an electric current pass through the galvanometer. The coil and attached mirror will turn through an angle about its vertical axis, and, by a well-known law of reflection, the image of the scale will apparently move through twice the angular distance described by the mirror. The reflected zero-line will pass to one side and some new graduation-line will appear in in its place as a continuation of the reference-mark, or it may be that in the new position of the mirror the reference-mark may fall between two reflected graduation-lines. In either case since the reference-mark remains stationary, and therefore indicates the former position of the zero-line, it is plain that the amount of angular deflection may be determined by noting the new position of the scale-image with respect to the reference-mark. The actual angular motion of the mirror will of course be but one-half the amount corresponding to the actual reading, but the graduation-spaces may, if desired, be made twice the width of the assigned unit, so that numerical division by two will not be required. In practice, however, no such provision is necessary.

It will be seen that the above arrangements are optically equivalent to a pointer and scale, the reference-mark being the pointer and the scale being a reflected image. Instead, however, of the pointer moving with regard to the scale as a clock-hand moves over its dial, the deflection is here measured by the motion of the scale-image with respect to the stationary reference-mark.

While I have herein illustrated the sight-opening as formed in the plate A, yet it is not essential that the guiding means for the observer's eye should be formed in the plate A, as it is obvious that it might be otherwise located.

As herein illustrated, the plate A has two functions—first, it acts as a support for the scale, and, second, a portion thereof performs the function of a guide for the eye. These two functions of the plate A are distinct from each other, however, and the lower part of the plate therefor is a member having graduations thereon, and the upper part, or that surrounding the sight-opening, is a member or the means to indicate the proper position to be occupied by the observer's eye in making observations. Although these two separate elements are integral with each other in this embodiment of my invention, yet they are nevertheless two distinct elements and might be disassociated from each other without departing from the invention.

It is of assistance to the observer in making observations to have the view of the surrounding objects cut off, so that the vision is not distracted by external objects. One simple way of accomplishing this is to make both the front and rear plates large enough so that as the observer makes observations they act as screens and exclude from the observer's vision any objects except the image in the mirror and the fiducial mark. It is not essential, however, that the screens be integral with the front and rear plates, as any arrangement of screens which would accomplish this object would come within my invention.

Although it has been necessary in order properly to describe the invention to illustrate it as used in connection with some particular instrument, yet I wish it clearly understood that the invention is not limited in its use to any particular instrument, but may be used in connection with any or all instruments in which the quantity under observation can be made to deflect a mirror. It is not essential to the invention that the mirror be supported to turn about a vertical axis, as with proper modifications in the arrangements this same principle may be employed in reading the deflections of a mirror which is arranged to turn about a horizontal or an oblique axis.

In the case of some quantities which are measured by means of accompanying motions the amounts of motion bear no direct and simple relation to the magnitudes of the quantities themselves. This is often the case with galvanometers, of which some give deflections subject to the so-called "law of tangents," while others have no regular law connecting their deflections with the strengths of the currents producing them. So far as concerns this difficulty my method of measurement is subject to substantially the same errors and is capable of the same corrections as other modes of readings, and therefore beyond the statement that such corrections are practicable and familiar to those skilled in such measurements as those under discussion I do not consider it necessary to enlarge upon the processes by which my scale may be calibrated experimentally or corrected by known laws when used to measure irregular deflections.

I wish to call especial attention to the fact that the reference or fiducial mark L is a non-reflected or a real mark, by which I mean a mark which the observer's eye actually sees instead of its reflection in a mirror. The point in the reference-mark which is referred to and utilized in making observations is that portion or point of the mark which apparently cuts into the reflection of the graduations in the mirror, and so far as the operativeness of the device is concerned, therefore, the reference-mark might be a properly-located point merely, as shown at L', Fig. 6. I intend the term "mark" as used in the specification and claims, therefore, to cover broadly any mark of whatever shape or form which is used in connection with the reflection in the mirror to indicate the amount of angular deflection.

The exact form of the front plate is not essential and may be changed in various ways without departing from the invention.

Believing that I am the first to provide a device for use in observing the deflections in a mirror, which device consists of a scale so placed that its reflection in the mirror is visible to the observer, together with a non-reflected mark placed on the opposite side of the mirror from the scale in such a position that the plane which includes the observer's eye and said mark intersects the reflection of the scale in the mirror of whatever kind the particular instrument may be to which these elements are applied, I desire to claim this broadly and consider as coming within my invention any device for noting deflections which has these elements arranged as pointed out in the claims.

Having described my invention, what I claim as new, and desire to secure by Letters Patent, is—

1. A device for indicating angular deflections, comprising a mirror adapted to be deflected, a member provided with graduations so placed that the reflection of the graduations in the mirror can be seen by the observer's eye, and means presenting a non-reflected reference-mark on the opposite side of the mirror from said member and in such a position that the plane which includes the observer's eye and said mark, intersects the reflected image of the graduations in the mirror.

2. In an apparatus of the class described, a member having graduations thereon, means presenting a non-reflected reference-mark, and a mirror adapted to be deflected, said mirror being placed approximately midway between the said member and the mark and situated so that the plane which includes the observer's eye and said mark intersects the reflection of the graduations in the mirror.

3. In an apparatus of the class described, a mirror adapted to be deflected, a member having graduations thereon, means presenting a non-reflected reference-mark on the opposite side of the mirror from said member in such a position that the plane which includes the observer's eye and said mark intersects the reflected image of the graduations in the mirror, and means to indicate the proper position to be occupied by the observer's eye in making observations.

4. In an apparatus of the class described, a mirror adapted to be deflected, a plate having a sight-hole and graduations and means presenting a non-reflected reference-mark situated on the opposite side of the mirror from said plate, said mirror, plate, and reference-mark being so situated with relation to each other that the plane which includes the observer's eye and the mark intersects the reflection of the graduations in the mirror.

5. In an apparatus of the class described, a mirror adapted to be deflected, a member provided with graduations so placed that the reflection of the graduations in the mirror can be seen by the observer's eye, means presenting a non-reflected reference-mark on the opposite side of the mirror from said member in such a position that the plane which includes the observer's eye and said mark intersects the reflected image of the graduations in the mirror, and means to screen from the observer's eye the view of external objects.

6. In an apparatus of the class described, a suspended mirror adapted to be deflected, a member provided with graduations and so placed that the reflection of the graduations in the mirror can be seen from the point of observation, and means presenting a non-reflected reference-mark in such a position that the plane which includes the observer's eye and said mark intersects the reflected image of the graduations in the mirror, the connection between the mirror and its suspending means being such as to leave an unobstructed view of its reference-mark and its intersection with the edge of the mirror.

PHILIP HENRY WYNNE.

Witnesses:
RICHARD C. WHITFORD,
INA M. BAKER.